H. W. MEYER.
AUTOMATIC WEIGHING APPARATUS.
APPLICATION FILED JULY 20, 1907.

917,882.

Patented Apr. 13, 1909.
6 SHEETS—SHEET 1.

Witnesses:
Paul Wollenberg
Arthur Scholz

Inventor
Heinrich Wilhelm Meyer
by Rebecca Tyler
Attorney

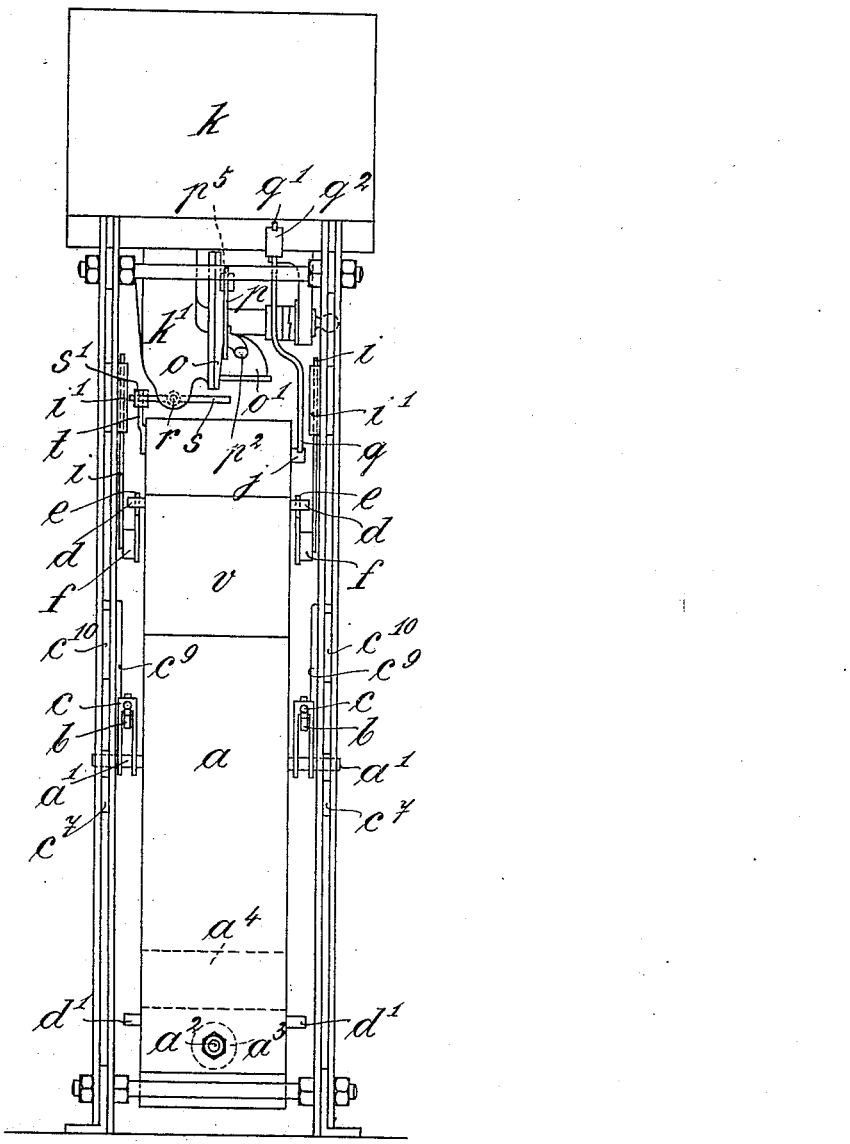

H. W. MEYER.
AUTOMATIC WEIGHING APPARATUS.
APPLICATION FILED JULY 20, 1907.
917,882.
Patented Apr. 13, 1909.
6 SHEETS—SHEET 3.
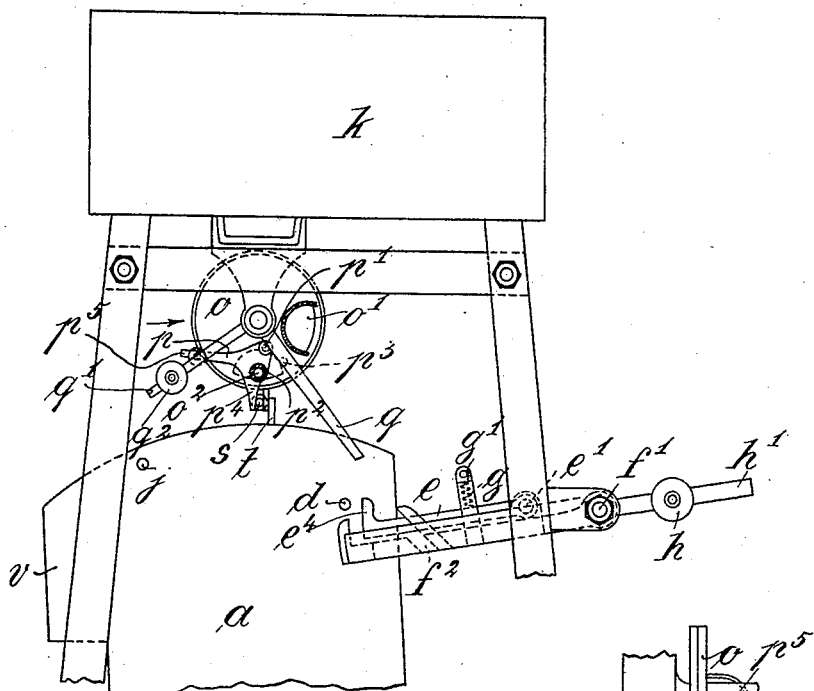
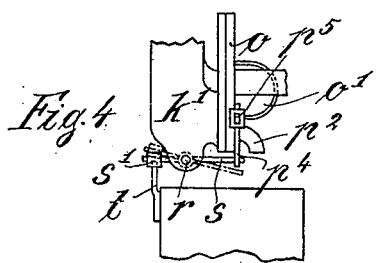
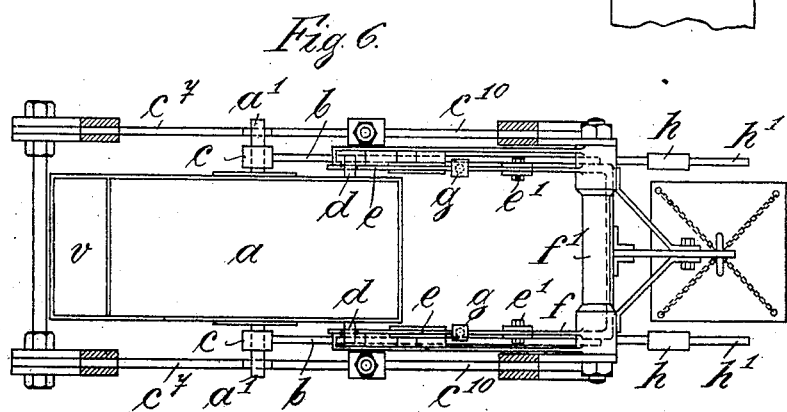
Witnesses:
Paul Wollenberg.
Arthur Scholz.
Inventor.
Heinrich Wilhelm Meyer
by
Attorney.
THE NORRIS PETERS CO., WASHINGTON, D. C.

H. W. MEYER.
AUTOMATIC WEIGHING APPARATUS.
APPLICATION FILED JULY 20, 1907.

917,882.

Patented Apr. 13, 1909.
6 SHEETS—SHEET 4.

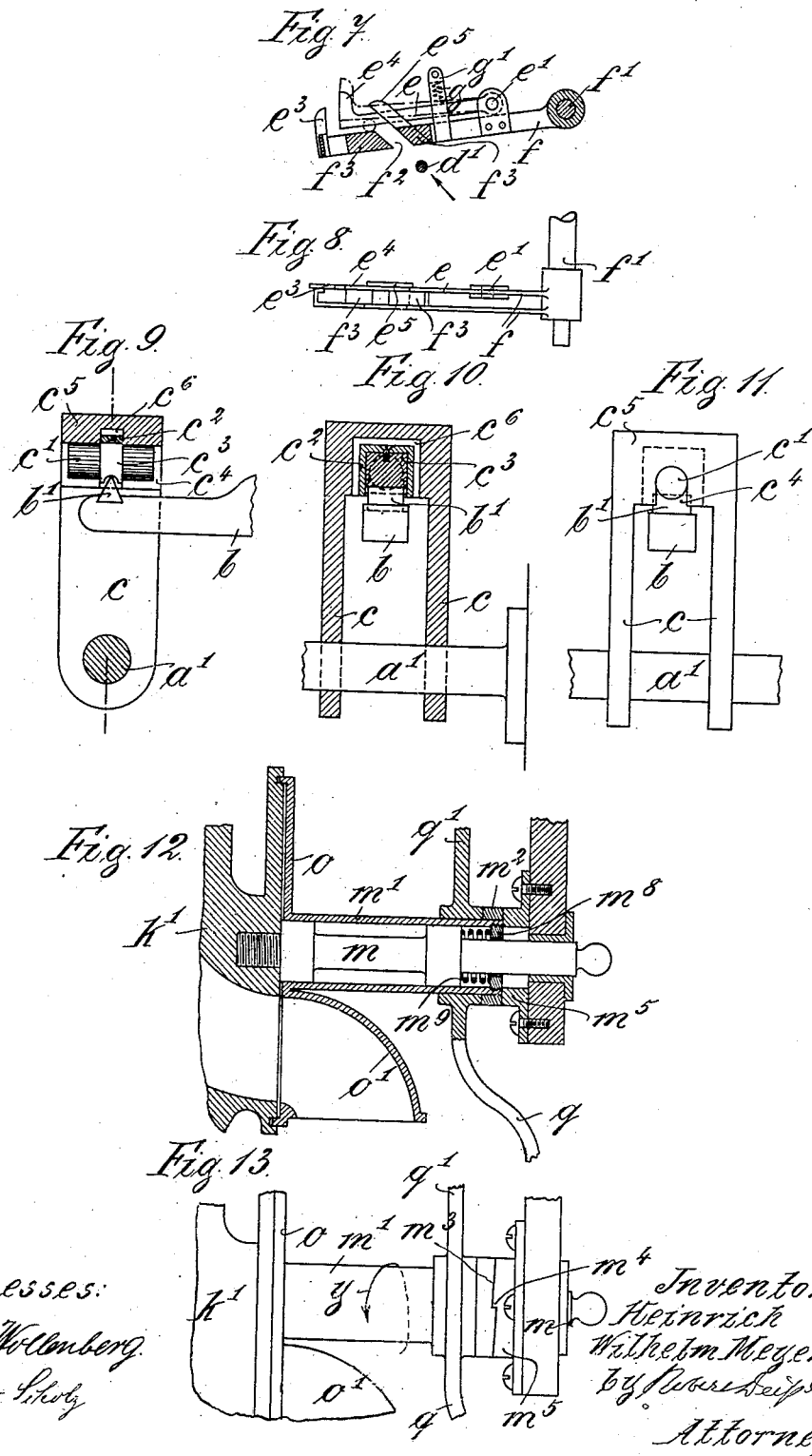

H. W. MEYER.
AUTOMATIC WEIGHING APPARATUS.
APPLICATION FILED JULY 20, 1907.
917,882.
Patented Apr. 13, 1909.
6 SHEETS—SHEET 6.
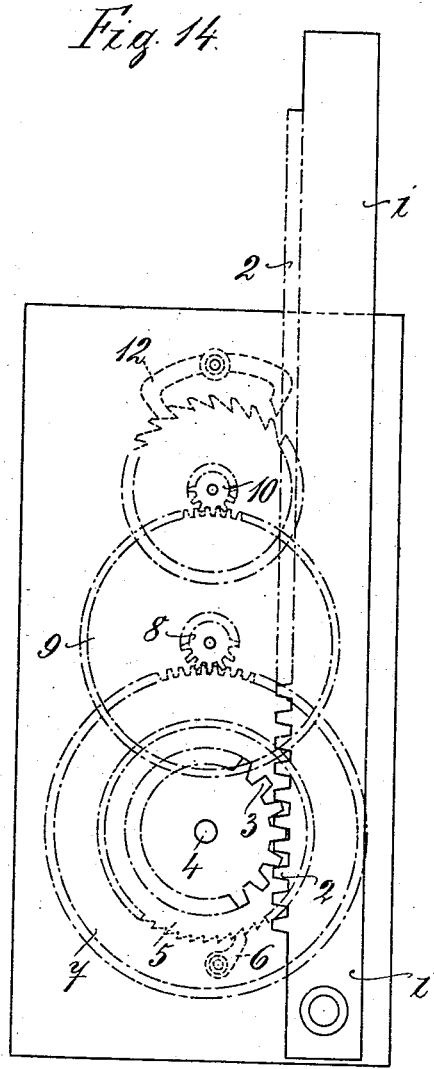
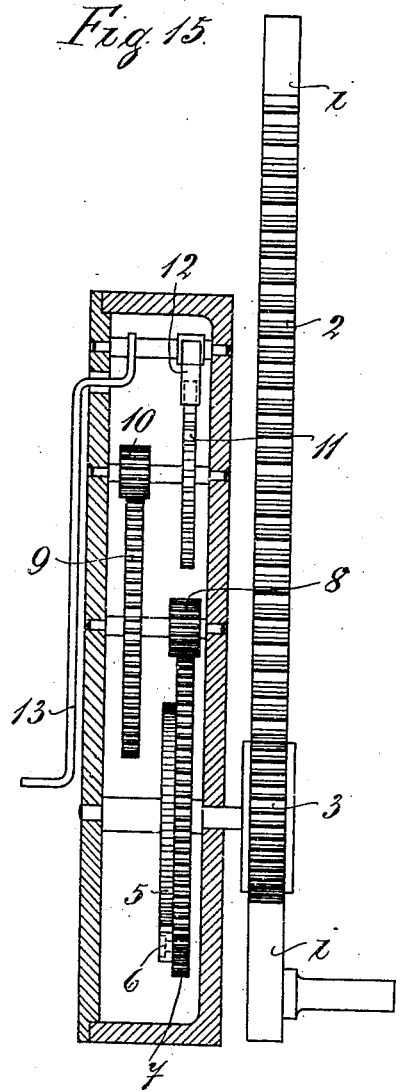
Witnesses:
Paul Wollenberg
Arthur Scholz
Inventor
Heinrich Wilhelm Meyer
by Robert Deiß
Attorney

UNITED STATES PATENT OFFICE.

HEINRICH WILHELM MEYER, OF BERLIN, GERMANY.

AUTOMATIC WEIGHING APPARATUS.

No. 917,882.  Specification of Letters Patent.  Patented April 13, 1909.

Application filed July 20, 1907. Serial No. 384,796.

*To all whom it may concern:*

Be it known that I, HEINRICH WILHELM MEYER, a subject of the King of Prussia, and resident of 4 Am Magdeburger Platz, Berlin, W., in the German Empire, have invented certain new and useful Improvements in Automatic Weighing Apparatus, of which the following is an exact specification.

This invention relates to an automatic weighing apparatus for use in weighing liquids or granular materials and is especially suited for weighing sugar juice. In such automatic weighing machines a double chambered receptacle has been used, in which the material to be weighed is filled into one chamber till almost the required weight has been filled in, then the material is fed at a slower rate till the exact amount has been reached. When this amount has been reached the double chambered receptacle sinks and is thereby freed and allowed to rotate, so as to tip the material out of the filled chamber and bring the other chamber of the receptacle under the filling spout into position for again commencing the operation.

The object of the present invention is to effect improvements in apparatus of this kind and to enable the use of a single chamber receptacle for the material to be weighed.

Figure 1:
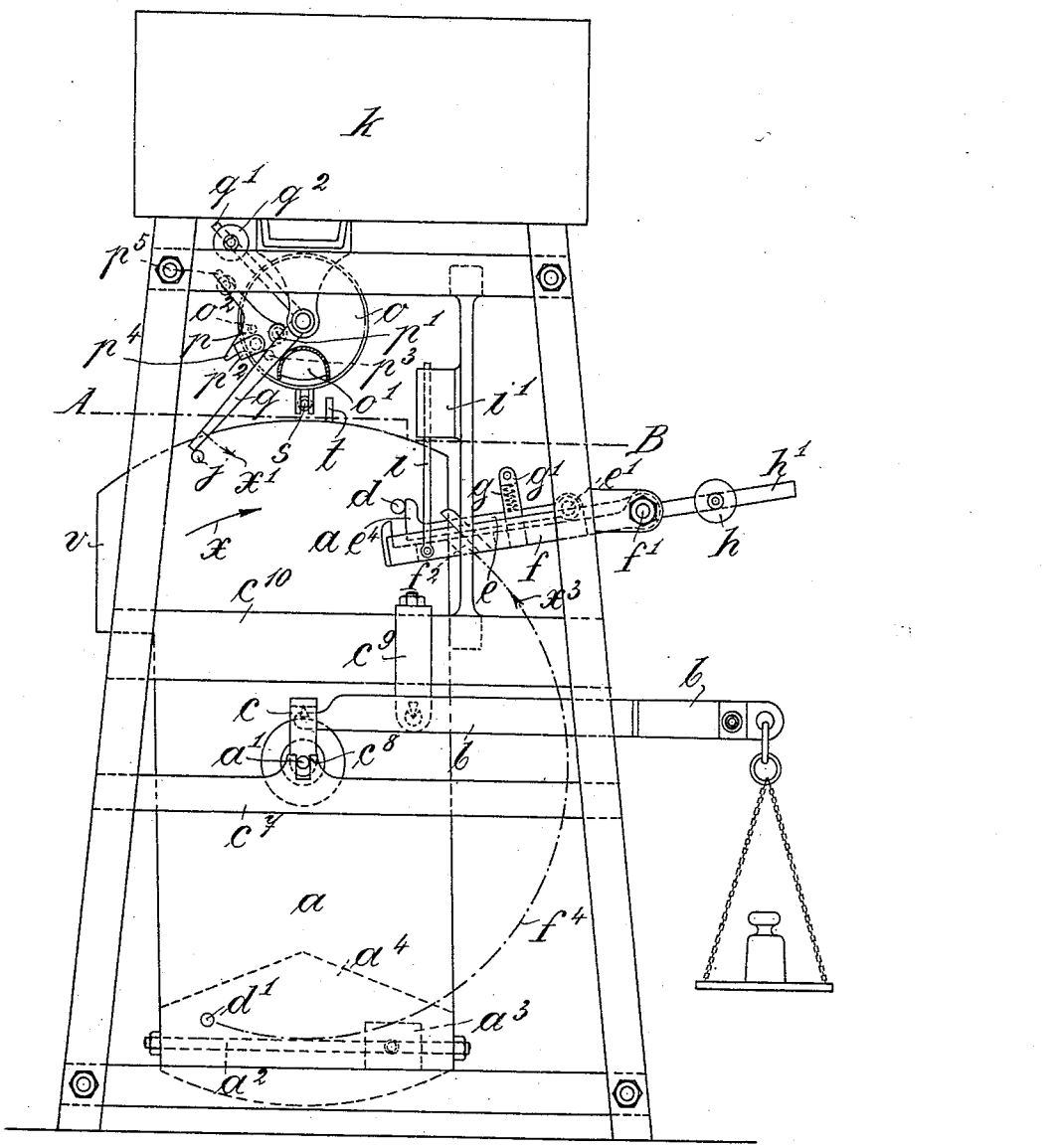
Figure 5:
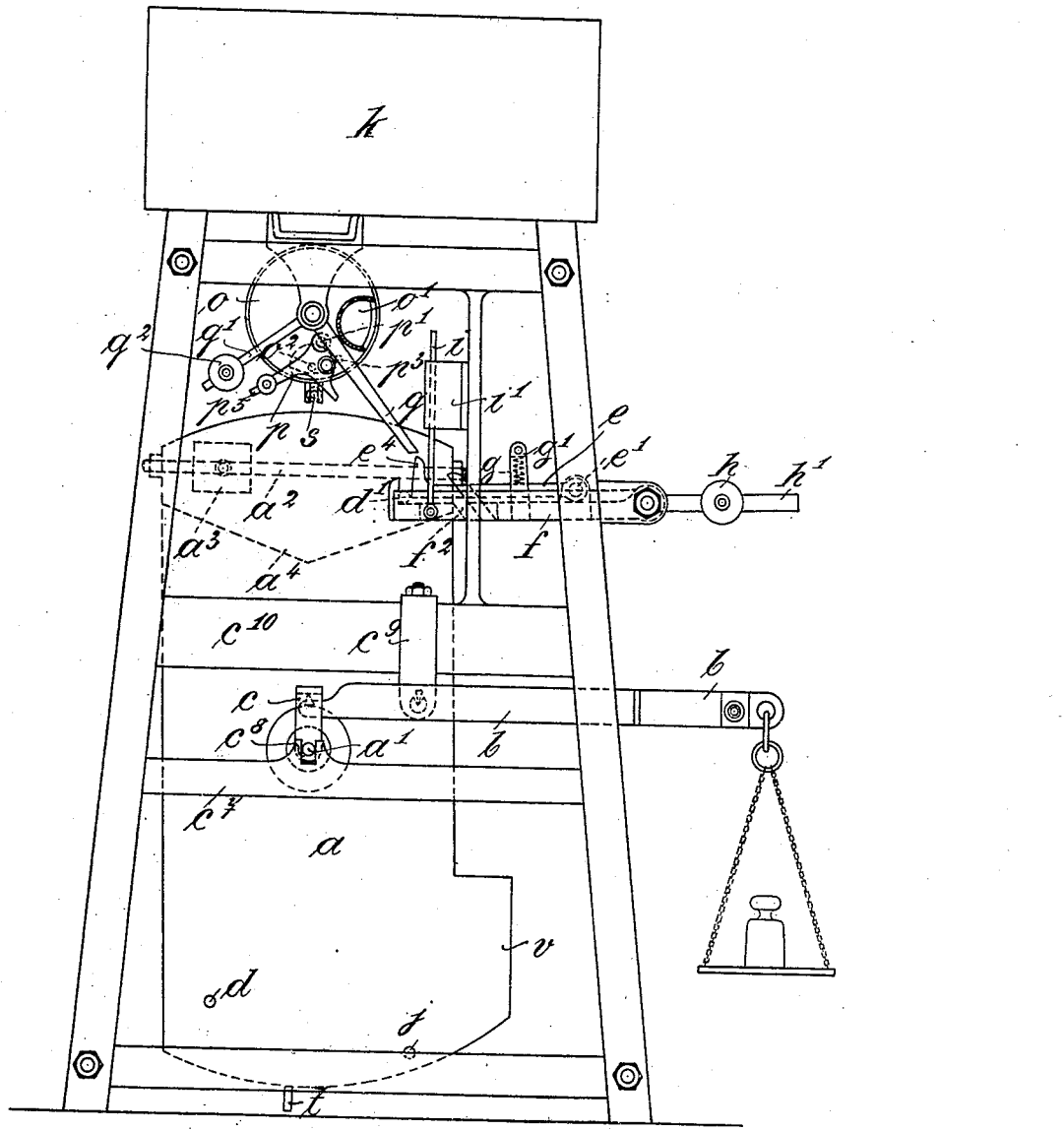

The invention also comprises other detailed improvements in the apparatus which will be more readily understood from the description hereafter and the accompanying drawings, in which:

Figure 1 is a side view of the weighing apparatus as a whole, the weighing receptacle being shown in the position occupied when filling. Fig. 2 is a front view of the apparatus according to Fig. 1. Fig. 3 is a fragmentary side view of the weighing receptacle when filled and ready to be emptied. Fig. 4 is a side view of the closing device for the secondary filling spout. Fig. 5 represents the weighing apparatus having the weighing receptacle tilted around and its contents emptied. Fig. 6 is a horizontal cross section on line A—B of Fig. 1. Fig. 7 is a detail view showing the damping and holding device for the weighing receptacle; Fig. 8 is a plan of the arrangement shown in Fig. 7; Fig. 9 is a transverse section showing the method of suspension for the weighing receptacle; Fig. 10 is a section of the device shown in Fig. 9 in a plane at right angles thereto. Fig. 11 is an outside view of the same. Fig. 12 represents in section the pivot arrangement for the cutting-off device. Fig. 13 is an outside view of the arrangement shown in Fig. 12. Fig. 14 is a sectional side view and Fig. 15 is a diagrammatic front view of the device used for damping the motion of the receptacle.

The apparatus according to this invention may be divided into three heads; firstly the weighing receptacle and the suspension device therefor; secondly the filling and closing device for governing the flow of the material into the receptacle, thirdly the arrangement for damping the motion of the receptacle and controlling its position.

Same references denote same parts of the apparatus throughout the specification.

Referring to the figures $a$ is the weighing receptacle having a single space for receiving the material to be weighed.

$v$ represents a projection or extended part of the receptacle for the purpose hereinafter fully described.

$a^4$ is the bottom of the receptacle having the shape of a roof. The walls of the receptacle are extended beyond the bottom $a^4$ as to form a space in which a balancing device is provided, consisting of a transverse rod $a^2$ attached by means of nuts to the two opposite walls of the receptacle. A balancing weight $a^3$ is mounted on the said rod and adapted to be shifted longitudinally thereon.

$d'$ are pins (see Fig. 2) arranged at the bottom end at both sides of the receptacle. In the same manner pins $d, d$ are arranged near the top end of the receptacle. On the left hand side of the receptacle $a$ a finger or stop $t$ is secured (see Fig. 2) and on the right hand side a pin $j$. The purpose of these pins and fingers will hereinafter be fully declared.

As to the suspension of the receptacle, pivots $a'$ are fixedly connected with two opposite side walls and pass through openings in the legs $c$ of a U-shaped supporting part (see Figs. 9 to 11). Such U-shaped parts are arranged at both sides of the receptacle to carry it. To this end and for obtaining great sensitiveness of the weighing apparatus the following arrangement is provided: A pivot $c'$ is mounted within a half circular recess $c^4$ of the connecting piece $c^5$ for the legs $c$. The former is provided with a recess $c^6$ in which a U-shaped bow $c^2$ works freely with a small amount of play between it and the walls of said recess $c^6$. The bow $c^2$ incloses a quadrangular part in the middle of the pivot $c'$ and as seen in Fig. 10 the legs of the bow $c^2$ are extended beyond this quadrangular part so as to inclose the edge $b'$ upon which the said quadrangular part is mounted by means of a half circular groove forming the bearing. Owing to this arrangement the edge $b'$ is prevented from leaving the said groove. The interstice $c^6$ is provided for enabling the pivots $c'$ to carry out small turning movements and to avoid jamming of the parts coöperating with each other so that great sensitiveness of the apparatus is obtained. The pivots $a'$ are extended beyond the legs $c$ (see Fig. 2) and are guided in the recesses $c^8$ of the cross bar $c^7$ of the frame work. Owing to this arrangement the amount of the turning movement of the weighing beam $b$ is limited and the receptacle lowers until the pivot $a'$ rests on the bottom of the recess $c^8$. The weighing beam $b$ is carried by hanging links $c^9$ suspended from the beam $c^{10}$.

After having described the weighing receptacle and its suspending device I proceed in describing the filling device.

The supply receptacle $k$ containing the juice of sugar to be weighed is provided with a discharging conduit $k'$. The exit of this conduit is shut off by a slide $o$ hereinafter called the main slide and having a chute $o'$. This main slide is fitted with a small opening $o^2$ and is provided with a slide $p$, hereinafter called the secondary slide. This secondary slide shows a small exit-conduit or nozzle $p^2$.
The chute $o'$ permits the juice to flow into the receptacle $a$ in large quantities for being quickly filled whereas the nozzle $p^2$ completes the charge till it has an exactly prescribed weight. The arrangement and the mounting of the slides are as follows: The slide $o$ is carried by a hollow shaft $m'$ mounted on a solid guiding shaft $m$; on its right hand end (see Fig. 12) the hollow shaft is fitted with a flange $m^2$ having an oblique recess $m^3$ with which a projection $m^4$ of a flanged collar $m^5$ engages in the manner known in claw-clutches. The collar $m$; as seen in Fig. 12 is screwed into the hollow shaft $m'$ and serves as an abutment for the spring $m^9$, the purpose of which will hereinafter be indicated. On the hollow shaft $m'$ a governing lever $q'$ $q$ is fixed, the arm $q'$ being provided with a counterweight and the arm $q$ being adapted to engage with the pin $j$ (see Figs. 1 and 2). The secondary slide $p$ is pivoted at $p'$ to the main slide and is provided with a weighted arm $p^5$ and a finger $p^4$, the latter being adapted to engage with the stop $t$. $p^3$ is a stop to limit the turning movement of the secondary slide after the nozzle $p^2$ is removed from the small hole $o^2$ in the main slide (see Fig. 1). Below the main conduit $k'$ and pivoted to convenient projections $r$ is arranged a lever $s$ carrying a roller $s'$ which is adapted to engage with the said finger $t$ as hereinafter will fully be indicated.

Now I will proceed in describing the third principal part of the apparatus or the device for controlling the motion and position of the receptacle $a$. Two of such devices are provided and each consists of two levers $f$ and $e$ arranged one above the other. The lever $f$ is carried by the axle $f'$ suitably mounted on the frame work of the machine. It is formed, for instance, of two links and iron pieces $f^3$ are riveted to them to impart sufficient weight to the device. The lever $f$ is provided with a passage $f^2$ coinciding with the circle $f^4$ described by the pins $d$ and $d'$ (see Fig. 1) and permitting these pins to pass through. At the inner end of the lever $a$ nose $e^3$ is arranged coöperating with the nose $e^4$ of the lever $e$ which is pivoted at $e'$ to the lever $f$. The parts $e^5$ secured to $f$ serve as guides for the lever $e$ and a helical spring $g$ supported by arms $g'$ tends to hold the lever $e$ forced against the lever $f$ (see Fig. 7). To the shaft $f'$ is rigidly secured a lever $h'$ (see Fig. 1), carrying a counterweight $b$ for balancing and regulating the weight of the levers $e$ and $f$. It may be preferable to connect the lever $f$ with a damper diagrammatically represented by $i$ and $i'$ of any known or desired construction for obtaining a slow downward motion of the levers.

The damper is illustrated in Figs. 14 and 15 in one convenient form. The upper end of the rod $i$ is provided with teeth 2 engaging in the teeth of a wheel 3 fixed on a shaft 4. On the shaft 4 there is also fixed a ratchet wheel 5 with which a pawl 6 carried by a toothed wheel 7 engages. The toothed wheel 7 is adapted to rotate loosely on the shaft 4 and gears through a train of wheels 8, 9 and 10 with a detent wheel 11. With this detent wheel there engages an escapement 12 the oscillations of which are timed by a pendulum 13.

The operation is as follows; When the pin $d'$ in the receptacle strikes the levers $e$ and $f$ the rod $i$ is raised to the position shown in Fig. 5. Owing to the direction of the ratchet teeth on the wheel 5 this motion proceeds undisturbed. The weight of the rod $i$ now acts like the weight of a clock and the time of descent is controlled by the escapement 12 and pendulum 13. Thus a convenient period of time is allowed to elapse before the pin $d'$ is released from the levers $e$ and $f$.

The operation of this weighing apparatus is as follows: The balancing weight $a^3$ (Fig. 1) is to be adjusted so as to put the center of gravity of the receptacle to the right hand side of the pivots $a'$, which causes the receptacle to tend to turn in the direction of the arrow $x$ (Fig. 1); the receptacle however is prevented from such movements owing to the arrangement of the pins $d$ which abut against the noses $e^4$ of the levers $e$. The latter together with the lever $f$ are held in position by the rod $i$ of the damper $i'$. At the same time the pin $j$ pushes against the arm $q$ of the main slide $o$ and holds thereby the chute $o'$ in juxtaposition to the exit opening of the conduit $k'$. The main slide $o$ and the secondary slide $p$ tend to turn in the direction of the arrow $x'$ (Fig. 1) owing to the fact that the arms $q'$ and $p^5$ are weighted.

$q^2$ is the weight mounted on the arm $q'$, the secondary slide is set fast by means of the stop $p^3$. This is the normal position of the weighing apparatus for the filling of the receptacle $a$.

When the receptacle is filled up to such a level that the juice of sugar or any other material to be weighed can enter the projection $v$ of the receptacle its center of gravity is displaced to the lefthand side of the pivots $a'$ and the receptacle commences to tilt in the direction of the arrow $x^3$. The arm $q$ thereby is disengaged from the stop $j$ and the chute $o'$ removed from the exit opening of the conduit $k'$. For obtaining a complete closure the oblique surfaces are provided in the flange $m^2$ and the collar $m^5$ resp. (See Figs. 12 and 13). The hollow shaft $m'$ and the slide $o$ are rotated in the direction of the arrow $y$ after the withdrawal of the stop $j$ from the arm $q$, the slide and the hollow shaft $m'$ are slightly moved toward the lefthand side and tightly pressed thereby against the front surface of the conduit $k'$; the spring $m^9$ is tensioned at the same time. For preventing the receptacle from being tilted around before the filling is completed the finger $t$ is provided which pushes against the roller $s'$ of the pivoted lever $s$. Against the righthand end of this lever $s$ pushes the arm $p^4$ of slide $p$, whereas the main slide moves somewhat further till it occupies its stable equilibrium. The nozzle $p^2$ is brought thereby in juxtaposition with the opening $o^2$ in the main slide $o$. This position is illustrated in Fig. 3. The material to be weighed now flows out in small quantities. The increasing weight of the contents of the receptacle causes the latter to lower slowly and when equilibrium is reached the top of the finger $t$ touches the roller $s'$ somewhat below the axis of the roller. As the receptacle has the tendency to tilt in the direction of the arrow $x^3$ the roller $s'$ is lifted and the opposite end of the lever $s$ lowered. The finger $t$ and the arm $p^4$ of the second slide are disengaged from the roller $s'$ and the lever $s$ respectively (see Fig. 4), the receptacle is turned completely around and discharged while the weighted arm $p^5$ causes the second slide to rotate till it pushes against the stop $p^3$, the opening $o^2$ in the main slide is thereby closed.

To secure a gentle movement of the receptacle and sufficient time during its discharge the stops $d'$ are provided which are passed during the tilting through the passage $f^2$ and between the levers $e$ and $f$. Owing to the spring $g$, the latter are lifted till the stops $d'$ enter the space between the noses $e^4$ and $e^3$ and abut against the nose $e^4$ (see Fig. 5) which prevents the receptacle from further rotation for a certain time sufficient for a complete discharge of the receptacle. At the same time the spring $g$ presses the lever $e$ on the lever $f$. The levers lower which takes place slowly owing to the damper and after the noses $e^4$ and the stops $d'$ are disengaged the receptacle completes its perfect revolution owing to the arrangement of the weight $a^3$. Near the end of the revolution the pin $j$ engages with the arm $q$ of the main slide, which is turned thereby in the direction opposite to the direction of the arrow $y$ (see Fig. 13). This movement is facilitated by means of a spring $m^9$.

The position of the receptacle is adjusted in a manner described above by means of the levers $e$, and $f$ and the pins $d$ thus occupy the normal position shown in Fig. 1, and all the parts are in position to recommence the cycle of operations.

Having thus fully described and ascertained the nature of my invention what I desire to secure by Letters Patent of the United States is:

1. An automatic weighing machine having in combination with weighing mechanism a rotatable single chambered receiving receptacle mounted so that when partially filled it is overbalanced at one side of its axis of rotation, means for limiting consequent rotation under the gravitational action of the load, said limiting means being inoperative when the receptacle subsequently sinks as the complete load is filled in, and supply means regulated by said limited rotation to supply the material more slowly to the receptacle said supply means being completely closed off by the sinking of the receptacle when the complete load is filled.

2. An automatic weighing machine having in combination with weighing mechanism a rotatable single chambered receiving receptacle mounted so that when partially filled it is overbalanced at one side of its axis of rotation, means for limiting consequent rotation under the gravitational action of the load, said limiting means being inoperative when the receptacle subsequently sinks as the complete load is filled in, a main supply valve closed by said limited rotation of the receptacle and an auxiliary supply valve brought into operation by said limited rotation and closed when the receptacle sinks as the complete load is filled in.

3. An automatic weighing machine having a single chambered weighing receptacle revolubly mounted, a weight fixed to the bottom of the receptacle at one side of the axis, a projecting lip part arranged on the upper part of receptacle diagonally to said weight weighing mechanism, and automatic holding means retaining said receptacle against rotation and released by the sinking of the receptacle when the required weight has been filled, substantially as described.

4. An automatic weighing machine having a revoluble receptacle and automatic filling and weighing means therefor, a pivot support for said revoluble receptacle comprising, a grooved trunnion part $c'$, a knife edge support for said receptacle, said knife edge resting in a groove in said trunnion, and a weighing lever on which said knife edge is carried, substantially as described.

5. In combination a single chambered receptacle revoluble under the gravitational action of the load, a weighing lever carrying said receptacle, pins on said receptacle, and levers projecting into the path of said pins and holding the receptacle in the filling and emptying positions as required.

6. In combination a single chambered receptacle revoluble under the gravitational action of the load, a weight fixed to the receptacle at one side of the axis of rotation of said receptacle, means for retaining the receptacle for a sufficient time in the emptying position against the action of the weight comprising, pins on said receptacle, and gripping members frictionally engaging said pins in the emptying position of said receptacle.

7. In combination, a single chambered receptacle revoluble under the gravitational action of the load, a weight fixed to the receptacle at one side of the axis of rotation of said receptacle, and means for retaining the receptacle for a sufficient time in the emptying position against the action of the weight comprising, a pin carried by the receptacle, and spring pressed levers frictionally engaging said pin during the inverted emptying position of the receptacle.

8. An automatic weighing machine having in combination a weighing lever, a single chambered receptacle revolubly supported by said lever, a weight carried by said receptacle and tending to turn the same when empty in one direction, an extended portion on said receptacle diagonally arranged to said weight, automatic filling means for said receptacle, closing gear for said filling means, projections carried by the receptacle and coöperating with the closing gear, when rotation of the receptacle occurs, substantially as described.

9. An automatic weighing machine having in combination a weighing lever, a single chambered receptacle revolubly supported by said lever, a suitably mounted weight carried by said receptacle and to an adjustable extent tending to turn the same when empty in one direction, an extended portion on said receptacle diagonally arranged to said weight, automatic filling means for said receptacle closing gear for said filling means, projections carried by the receptacle and coöperating with the closing gear when said rotation of the receptacle occurs, substantially as described.

10. An automatic weighing machine having in combination a weighing lever, a revoluble single chambered receptacle, trunnions on said receptacle, a U-piece carried by said lever and engaging with said trunnion, a weight on the bottom and to one side of the vertical axis of said receptacle, a projecting lip portion diagonally arranged to said counter weight, automatic filling means for said receptacle, closing gear for said filling means, projections carried by the receptacle and coöperating with the closing gear when rotation of the receptacle occurs, substantially as described.

11. An automatic weighing machine, having in combination a weighing lever, a substantially gnomon-shaped single chambered receptacle revolubly supported by said lever, a suitably mounted counter weight on the closed end of said receptacle and diagonally arranged to the projecting part of same, a main filling spout for said receptacle a closing slide by which said spout is carried, an auxiliary filling spout carried by said slide, closing means for said auxiliary spout, projections carried by the receptacle and coöperating during the rotation of the receptacle to close the main spout when a certain quantity of material has been filled in, and then to close the auxiliary nozzle, when the exact desired amount has been passed in, substantially as described.

12. In an automatic weighing machine having a revolubly mounted receptacle, a main filling device placed out of action by a partial rotation of the receptacle, an auxiliary filling device brought into operation by said partial rotation and comprising a revolubly carried weighted slide, a pivoted member $s$ holding said slide in the filling position, a projection on the receptacle engaging said pivoted member, said projection being disengaged when receptacle sinks on the required weight being filled therein, means rendered operative by the subsequent rotary movement of the receptacle for closing the auxiliary filling nozzle.

13. In an automatic weighing machine having a revolubly mounted receptacle, a main filling device placed out of action by a partial rotation of the receptacle, an auxiliary filling device brought into operation by said partial rotation and comprising a revolubly carried weighted slide, a pivoted member holding said slide in filling position, a roller carried by said pivoted member, a projection on the receptacle engaging said roller above its axis, but on the sinking of the receptacle when the desired weight is filled, engaging said roller below its axis and thereby releasing the pivoted auxiliary slide for the purpose of closing the same and permitting rotation of the receptacle for the purpose of emptying, substantially as hereinbefore described.

In witness whereof I have hereunto set my hand in the presence of two witnesses.

HEINRICH WILHELM MEYER.

Witnesses:
HENRY HASPER,
WOLDEMAR HAUPT.